United States Patent
Chen et al.

(10) Patent No.: US 9,178,758 B2
(45) Date of Patent: Nov. 3, 2015

(54) METHODS FOR SHORTENING CSFB PERFORMANCE TIME AND COMMUNICATION APPARATUSES UTILIZING THE SAME

(71) Applicant: MediaTek Inc., Hsin-Chu (TW)

(72) Inventors: Hung-Yueh Chen, Taipei (TW); Chun-Pin Chen, Taoyuan (TW); Chih-Yuan Tsai, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 171 days.

(21) Appl. No.: 13/941,608

(22) Filed: Jul. 15, 2013

(65) Prior Publication Data
US 2014/0112119 A1    Apr. 24, 2014

Related U.S. Application Data (60) Provisional application No. 61/717,875, filed on Oct. 24, 2012.

(51) Int. Cl.
*H04L 12/24* (2006.01)
*H04W 36/00* (2009.01)

(52) U.S. Cl.
CPC ....... *H04L 41/0681* (2013.01); *H04W 36/0022* (2013.01)

(58) Field of Classification Search
CPC .. H04L 41/0681; H04W 36/14; H04W 36/22; H04W 36/30; H04W 36/32; H04W 80/04
See application file for complete search history.

(56) References Cited

U.S. PATENT DOCUMENTS

| | | |
|---|---|---|
| 2010/0113010 A1 | 5/2010 | Tenny et al. |
| 2010/0317347 A1* | 12/2010 | Burbidge et al. ............ 455/436 |
| 2011/0222509 A1* | 9/2011 | Lee .............................. 370/331 |
| 2013/0051362 A1* | 2/2013 | Lee et al. ..................... 370/331 |
| 2013/0070728 A1* | 3/2013 | Umatt et al. ................. 370/331 |
| 2013/0150054 A1* | 6/2013 | Axmon et al. ................ 455/440 |
| 2014/0235242 A1* | 8/2014 | Granzow et al. ............. 455/436 |

FOREIGN PATENT DOCUMENTS

WO    2008157573 A1    12/2008

* cited by examiner

*Primary Examiner* — Jung Park
*Assistant Examiner* — Chuong M Nguyen
(74) *Attorney, Agent, or Firm* — McClure, Qualey & Rodack, LLP (57) ABSTRACT

A method for shortening a circuit switch fallback (CSFB) performing time includes determining a plurality of weighting values each associated with one of a plurality of frequencies to be measured during a CSFB procedure, determining a frequency measurement sequence for scheduling the frequencies to be measured in sequence according to the determined weighting values, and measuring a signal quality on the frequencies according to the frequency measurement sequence.

28 Claims, 5 Drawing Sheets

| Frequency | Band | RAT |
|---|---|---|
| ARFCN_0 | Band I | 2G |
| UARFCN_1 | Band III | 3G |
| .... | | |

FIG. 3

| Trigger Type | Purpose/EventID | Report Amount |
|---|---|---|
| Periodical | reportStrongestCells | 1 |
| Event | A4 | 2 |
| .... | | |

FIG. 4

| Source Cell | Target Cell Freq | Action |
|---|---|---|
| LTE cell ID 0 | UARFCN_0 | Performed |
| LTE cell ID 1 | ARFCN_1 | Not performed |
| .... | | |

METHODS FOR SHORTENING CSFB PERFORMANCE TIME AND COMMUNICATION APPARATUSES UTILIZING THE SAME

CROSS REFERENCE TO RELATED APPLICATIONS

This application claims the benefit of U.S. Provisional Application No. 61/717,875 filed 2012 Oct. 24 and entitled "The Method of Shorten CSFB Delay and CSFB Successful Rate", the entire contents of which are hereby incorporated by reference.

BACKGROUND OF THE INVENTION

1. Field of the Invention

The invention relates to methods for shortening CSFB performance time.

2. Description of the Related Art

The evolution of wireless communication technologies often requires that newer systems and networks be compatible with existing systems and networks. A communication specification defining the operation of new technology often provides requirements for the new system to interface with these legacy systems. For example, the 3GPP Long term Evolution (LIE) standard requires that a wireless communication device be able to use circuit switched networks for voice calls as well as utilizing the LTE network. For example, LTE allows a circuit switched fall back (CSFB) procedure, in which an LTE handset can leverage the existing infrastructure of previous 2G or 3G technologies to make or receive voice calls. In other words, the LTE handset can drop an existing LTE connection with an LTE evolved Node B (eNB) and fall back to a 2G or 3G cell (e.g., Node B or base station). During the CSFB procedure, the LTE session is suspended. Upon completion of the call, the LTE handset can then re-establish a connection with the LTE network.

However, when performing CSFB, long delay times usually occur. A long delay time can be frustrating for the user and contribute to a high failure rate in establishing voice calls.

Therefore, a method for shortening CSFB delays is highly required.

BRIEF SUMMARY OF THE INVENTION

Communication apparatuses and methods for shortening circuit switch fallback (CSFB) performance time are provided. An embodiment of a communication apparatus comprises a radio frequency (RF) signal processing device, a baseband signal processing device and a processor. The RF signal processing device processes a plurality of RF signals transmitted to or received from a serving cell. The baseband signal processing device processes a plurality of baseband signals. The processor controls operations of the RF signal processing device and the baseband signal processing device. The processor determines whether performing a circuit switch fallback (CSFB) procedure is required, and when performing the CSFB procedure is required, the processor further determines a plurality of weighting values each associated with one of a plurality of frequencies to be measured during the CSFB procedure, determines a frequency measurement sequence for scheduling the frequencies to be measured in sequence according to the determined weighting values and measures a signal quality on the frequencies according to the frequency measurement sequence.

An embodiment of a method of shortening circuit switch fallback (CSFB) performance time, executed by a communication apparatus camping on a serving cell, comprises: determining a plurality of weighting values each associated with one of a plurality of frequencies to be measured during a CSFB procedure; determining a frequency measurement sequence for scheduling the frequencies to be measured in sequence according to the determined weighting values; and measuring a signal quality on the frequencies according to the frequency measurement sequence.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
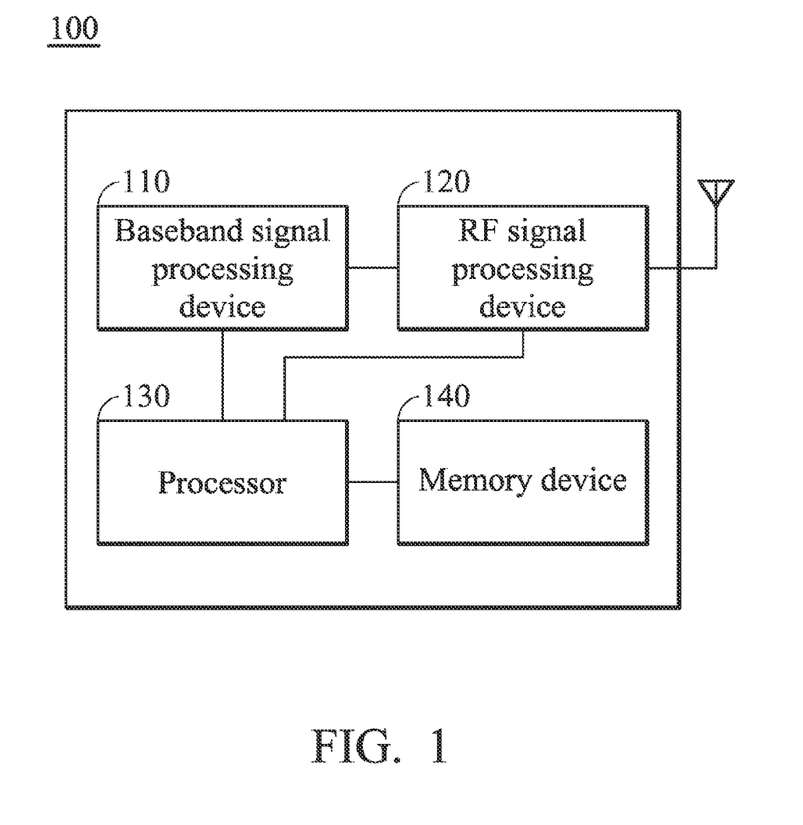
FIG. 1 shows a block diagram of a communication apparatus according to an embodiment of the invention.

FIG. 1 shows a block diagram of a communication apparatus according to an embodiment of the invention. The communication apparatus 100 may be a notebook, a cellular phone, a portable gaming device, a portable multimedia player, a Global Positioning System (GPS), a receiver, a personal digital assistant, a tablet computer, or others. The communication apparatus 100 may comprise at least a baseband signal processing device 110, a radio frequency (RF) signal processing device 120, a processor 130, a memory device 140, and at least one antenna. The RF signal processing device 120 may receive RF signals via the antenna, and process the received RF signals to convert the received RF signals to baseband signals to be processed by the baseband signal processing device 110, or receive baseband signals from the baseband signal processing device 110 and convert the received baseband signals to RF signals to be transmitted to a peer communication apparatus. The RF signal processing device 120 may comprise a plurality of hardware elements to perform radio frequency conversion. For example, the RF signal processing device 120 may comprise a mixer to multiply the baseband signals with a carrier oscillated in the radio frequency of the wireless communication system, such as a Global System for Mobile Communication (GSM) system, a Universal Mobile Telecommunication System (UMTS) system, a Long Term Evaluation (LTE) system, a Worldwide Interoperability for Microwave Access (WiMAX) system, a Wireless Local Area Network (WLAN) system, or others.

The baseband signal processing device 110 may further process the baseband signals to convert the baseband signals to a plurality of digital signals, and process the digital signals, and vice versa. The baseband signal processing device 110 may also comprise a plurality of hardware elements to perform baseband signal processing. The baseband signal processing may comprise analog-to-digital conversion (ADC)/digital-to-analog conversion (DAC), gain adjustment, modulation/demodulation, encoding/decoding, and so on.

The processor 130 may control the operations of the baseband signal processing device 110, the RF signal processing device 120 and the memory device 140 which may store the system data and program codes of the communication apparatus 100. According to an embodiment of the invention, the processor 130 may be arranged to execute the program codes of the corresponding software module(s) of the baseband signal processing device 110 and/or the RF signal processing device 120. The program codes accompanied with specific data in a data structure may also be referred to as a processor logic unit or a stack instance when being executed. Therefore, the processor 130 may be regarded as comprising a plurality of processor logic units each for executing one or more specific functions or tasks of the corresponding software module(s).

Note that in some embodiments of the invention, the processor 130 may be configured inside of the baseband signal processing device 110 and the invention should not be limited to the architecture as shown in FIG. 1. In addition, note that, in order to clarify the concept of the invention, FIG. 1 presents a simplified block diagram, in which only the elements relevant to the invention are shown. However, the invention should not be limited what is shown in FIG. 1.

During a CSFB procedure, a user equipment (UE) (such as the communication apparatus 100) establishes a connection with a wireless network (such as the LTE network) first. Next, the UE performs inter-radio access technology (inter-RAT) measurement for measuring signal quality on a plurality of frequencies and reports the measurement results to the wireless network. Next, the wireless network determines whether to trigger a handover (or, a redirection or cell change order) according to the measurement reports. When the handover (or, a redirection or cell change order) is triggered, the wireless communication services of the UE are handed over from a serving cell that the UE currently camps on to a target cell (which may belong to a 2G, 3G or other RAT). Finally, the UE sets up a voice call via the target cell and the CSFB procedure is complete. Upon completion of the call, the UE may then re-establish a connection with the original wireless network (such as the LTE network).

In the inter-RAT measurement, the wireless network may request the UE to measure signal quality on a plurality of frequencies so as to find a suitable cell around the UE as a target cell. Conventionally, the inter-RAT measurement is performed blindly in a round-robin manner. That is, a frequency to be measured is randomly picked from a frequency list comprising the plurality of frequencies. However, since the long performance time of the CSFB procedure can result in users becoming frustrated and a high failure rate in establishing voice calls, methods for shortening the CSFB performance time, especially the performance time taken in the inter-RAT measurement, are proposed in the following embodiments of the invention.

Figure 2:
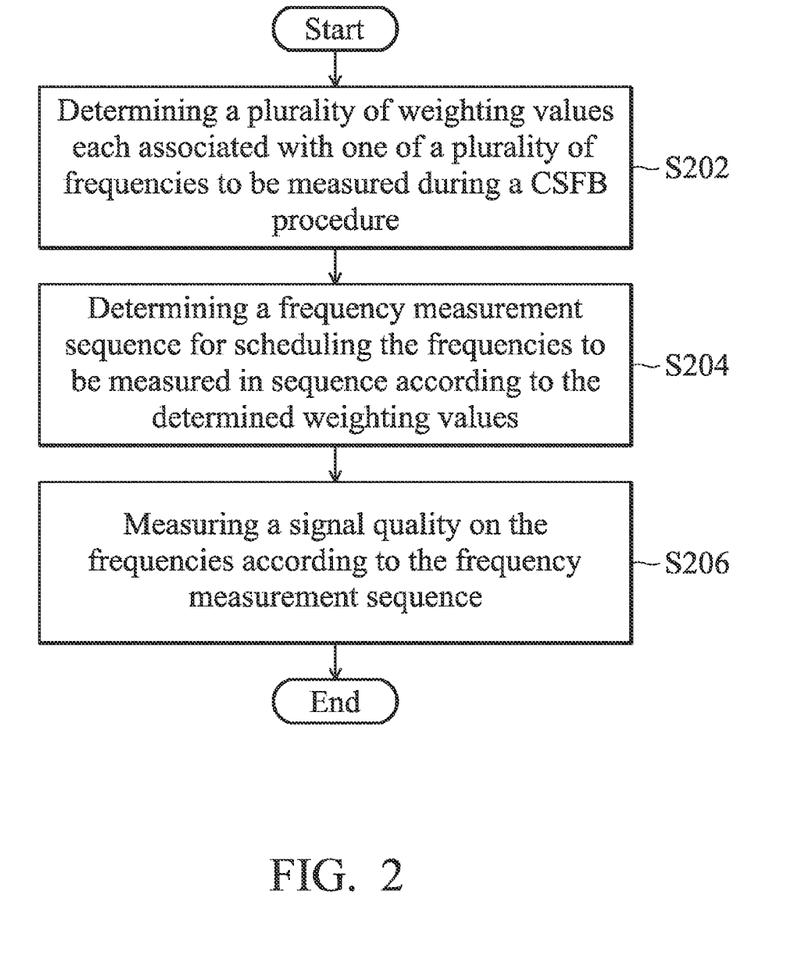
FIG. 2 shows a flow chart of a method for shortening CSFB performance time according to an embodiment of the invention.

FIG. 2 shows a flow chart of a method for shortening CSFB performance time according to an embodiment of the invention. The method may be executed by a communication apparatus (such as the communication apparatus 100) camping on a serving cell during a CSFB procedure upon receiving a message from the serving cell (or the corresponding wireless network) to request to begin the CSFB procedure. According to an embodiment of the invention, the message may be, but is not limited to, an Extended Service Request message, for example. First of all, the processor 130 of the communication apparatus 100 may determine a plurality of weighting values, each associated with one of a plurality of frequencies to be measured during a CSFB procedure (Step S202). According to an embodiment of the invention, the frequencies to be measured may be assigned by the Absolute Radio Frequency Channel Number (ARFCN), UTRA Absolute Radio Frequency Channel Number (UARFCN) and/or EUTRA Absolute Radio Frequency Channel Number (EARFCN). Next, the processor 130 may further determine a frequency measurement sequence for scheduling the frequencies to be measured in sequence according to the determined weighting values (Step S204). Finally, the processor 130 may measure a signal quality on the frequencies according to the frequency measurement sequence (Step S206). The signal quality may be, for example, the receiving level (RX level), the signal to noise ratio (SNR) Ec/NO, the Reference Signal Receiving Power (RSRP), the Reference Signal Receiving Quality (RSRQ), or the likes. Note that the devices involved in and methods utilized for measuring signal quality corresponding to a cell or a predetermined frequency is well-known in the art, and are not described here for brevity.

According to an embodiment of the invention, the processor 130 may determine the weighting values mainly based on two aspects, comprising information regarding one or more previous CSFB procedure(s) that has/have been performed before and the RAT preference. For the first aspect, the information regarding one or more previous CSFB procedure(s), the information may be the network configuration(s) recorded when performing the one or more previous CSFB procedure(s) and/or the execution result(s) obtained when performing the one or more previous CSFB procedure(s).

Note that, based on the concept of the invention, the factors utilized for determining the weighting values may be well-defined such that the higher weighting value directs to a higher CSFB success rate or a shorter measurement time. Therefore, the processor 130 determines the frequency measurement sequence such that a frequency with a higher weighting value is measured earlier and the time taken for the inter-RAT measurement can be greatly reduced. When the CSFB performance time is reduced, the CSFB failure rate may be reduced accordingly.

According to an embodiment of the invention, the network configuration(s) may be selected from a group comprising a target frequency having a cell that has been camped on successfully during the previous CSFB procedure(s), a RAT of the target frequency, the band of the target frequency, and a measurement configuration set in the previous CSFB procedure(s). The measurement configuration may comprise a trigger type, a purpose, a report amount, and so on.

For example, the weighting value associated with a frequency among the frequencies to be measured in the current CSFB procedure may be increased when the frequency matches the target frequency having a cell that has been camped on successfully during the previous CSFB procedure(s). In another example, the weighting value associated with a frequency among the frequencies to be measured in the current CSFB procedure may be increased when a RAT of the frequency matches the RAT of the target frequency having a cell that has been successfully camped on during the previous CSFB procedure(s).

In yet another example, the weighting value associated with a frequency among the frequencies to be measured in the current CSFB procedure may be increased when the band of the frequency matches the band of the target frequency having a cell that has been camped on successfully during the previous CSFB procedure(s). In still another example, the weighting value associated with a frequency among the frequencies to be measured in the current CSFB procedure may be increased when a measurement configuration associated with the frequency matches the measurement configuration set in the previous CSFB procedure(s).

According to another embodiment of the invention, the execution result(s) may be selected from a group comprising a network's response to a measurement report during the previous CSFB procedure(s) (for example, whether a handover, a redirection, or a cell change order with respect to a target frequency was triggered upon receiving a measurement report), whether the previous CSFB procedure(s) with respect to a target frequency succeeded and whether a location area update (LAU) with respect to a target frequency and the serving cell was performed during the previous CSFB procedure(s).

For example, the weighting value associated with a frequency among the frequencies to be measured in the current CSFB procedure may be increased when the frequency matches the target frequency and the handover, the redirection, or the cell change order with respect to the target frequency was triggered upon receiving a measurement report associated with the target frequency during the previous CSFB procedure(s). As described above, the wireless network may determine whether to trigger a handover, a redirection, or a cell change order to a cell on the target frequency based on the measurement report of the target frequency.

In another example, the weighting value associated with a frequency among the frequencies to be measured in the current CSFB procedure may be increased when the frequency matches the target frequency and the previous CSFB procedure(s) with respect to the target frequency succeeded. Here, the term "succeeded" means that the voice call was successfully handed over to a target cell on the target frequency in the previous CSFB procedure(s).

In yet another example, the weighting value associated with a frequency among the frequencies to be measured in the current CSFB procedure may be decreased when the frequency matches the target frequency and the LAU with respect to the target frequency and the serving cell was performed. Generally, when a target cell and the serving cell belong to different location areas, the LAU should be performed before the performing the redirection, or the cell change order procedure. When a previous execution result indicates that a LAU was performed with respect to the target frequency and the serving cell, it means that the cell(s) on the target frequency and the serving cell that the UE currently camps on belong to different location areas, and if the UE is commanded by the wireless network to hand over to a cell on the target frequency, the LAU should be performed first. However, since the LAU is a time-consuming procedure, when a previous execution result indicates that a LAU was performed, the weighting value associated with the frequency may be decreased such that the frequency may be measured later in the current CSFB procedure.

For the second aspect, the processor 130 may also determine the weighting values based on the RAT preference. To be more specific, since the frequencies to be measured in the current CSFB procedure may belong to different RATs, different weighting may be assigned to different RATs based on the RAT preference. According to an embodiment of the invention, the RAT preference may be determined by the RAT's properties. The RAT's properties may comprise the time required to complete a measurement for a cell or a frequency belonging to the RAT, the data throughput (or performance, or functionality) supported by the RAT, and the RAT preference of the different public land mobile networks (PLMNs).

For example, if the time required for completing a regular measurement for a cell or a frequency belonging to GSM is longer than UMTS, the frequency among the frequencies to be measured in the current CSFB procedure may be given a higher weighting value when it belongs to the UMTS RAT than to the GSM RAT.

In another example, since the UMTS network supports a higher data rate than the GSM network, the data throughput supported by the UMTS RAT is supposed to be higher than the GSM RAT. Therefore, the frequency among the frequencies to be measured in the current CSFB procedure may be given a higher weighting value when it belongs to a UMTS RAT than to a GSM RAT. In yet another example, since the GSM RAT does not support dual transmission mode (DTM) but the UMTS RAT can support DTM, the data throughput supported by the UMTS RAT is supposed to be higher than the GSM RAT. Therefore, the frequency among the frequencies to be measured in the current CSFB procedure may be given a higher weighting value when it belongs to the UMTS RAT than to the GSM RAT.

In still another example, when a PLMN that the UE registers to (that is, the PLMN managing the serving cell that the UE currently camps on) prefer a RAT (for example, GSM) for CSFB than anther RAT (for example, UMTS), the frequency among the frequencies to be measured in the current CSFB procedure may be given a higher weighting value when it belongs to the GSM RAT than to the UMTS RAT.

Figure 3:
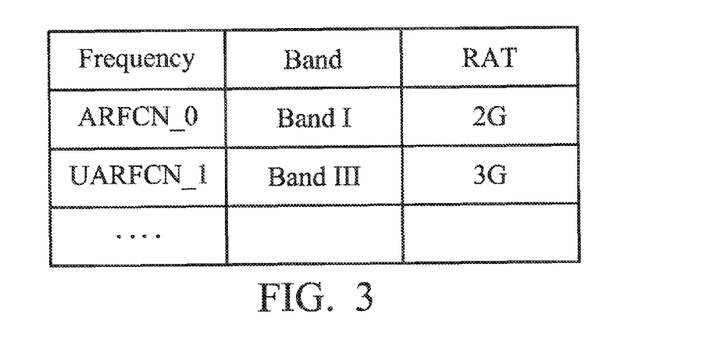
FIG. 3 shows an exemplary table for storing information regarding a target frequency measured in one or more previous CSFB procedure(s) and the corresponding RAT and band according to an embodiment of the invention.

According to an embodiment of the invention, the communications apparatus 100 may create a plurality of tables for storing information regarding one or more previous CSFB procedure(s) that have been performed before and the RAT preference in the memory device 140. FIG. 3 shows an exemplary table for storing information regarding a target frequency measured in the previous CSFB procedure(s) and the corresponding RAT and band according to an embodiment of the invention.

Figure 4:
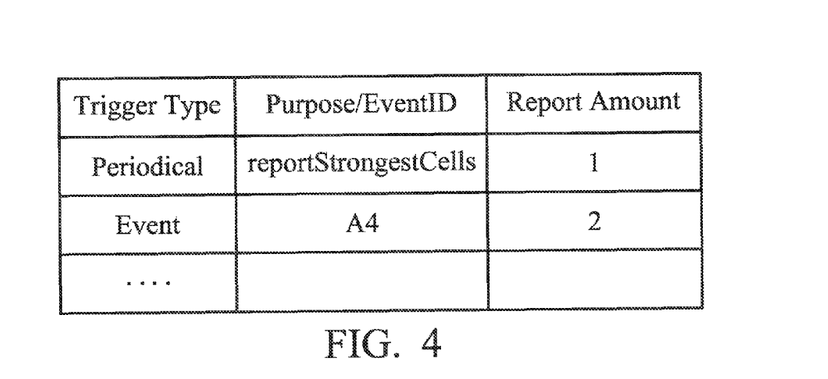
FIG. 4 shows an exemplary table for storing information regarding measurement configurations set in one or more previous CSFB procedure(s) according to an embodiment of the invention.

FIG. 4 shows an exemplary table for storing information regarding measurement configurations set in one or more previous CSFB procedure(s) according to an embodiment of the invention. The trigger type field may record whether reporting a measurement report is even-triggered or periodically. The purpose/eventID field may record a purpose or a corresponding event ID for reporting the measurement report. The report amount field may record the amount of measurement report request to be reported to the network.

Figure 5:
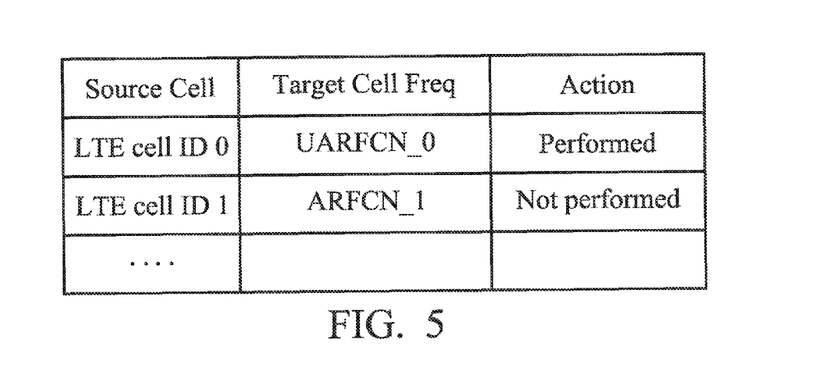
FIG. 5 shows an exemplary table for storing information regarding whether LAU was performed or not in one or more previous CSFB procedure(s) according to an embodiment of the invention.

FIG. 5 shows an exemplary table for storing information regarding whether a LAU was performed or not in one or more previous CSFB procedures according to an embodiment of the invention. The source cell field may record the cell ID for the original serving cell. The target cell field may record the frequency associated with the target cell for a handover (or a redirection, or a cell change order) procedure. The action field may record whether the LAU with respect to the target cell and the serving cell was performed. Note that those who are skilled in this technology can still make various alterations and modifications without departing from the scope and spirit of this invention to create other tables for storing information regarding the factors utilized in determining the weighting values based on the concept of the invention as discussed above. In addition, note that the content in the tables may be updated after a CSFB procedure is finished or when obtaining information regarding the RAT preference from the network or from its own previous experiences.

Figure 6:
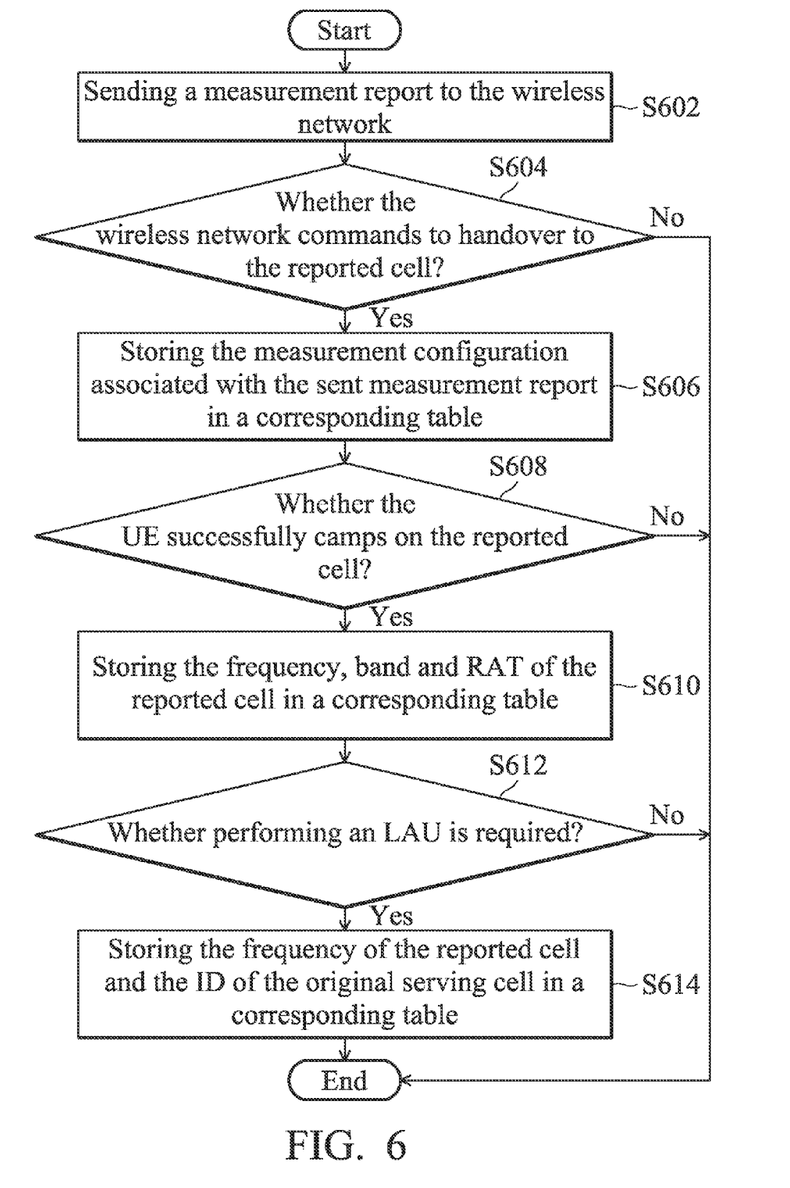
FIG. 6 shows a flow chart of a method for updating the content in the tables recording information regarding one or more previous CSFB procedure(s) according to an embodiment of the invention.

FIG. 6 shows a flow chart of a method for updating the content in the tables recording information regarding one or more previous CSFB procedures according to an embodiment of the invention. After sending a measurement report to the wireless network during a current CSFB procedure (step S602), the processor 130 may determine whether the wireless network commands to handover (or redirection or cell change order) to the reported cell (step S604). If so, the processor 130 may store the measurement configuration associated with the sent measurement report in a corresponding table (such as the one shown in FIG. 4) (step S606). Next, the processor 130 may further determine whether the UE successfully camps on the reported cell (step S608). If so, the processor 130 may store the frequency, band, and RAT of the reported cell in a corresponding table (such as the one shown in FIG. 3) (step S610). Next, the processor 130 may further determine whether performing an LAU is required (step S612). If so, the processor 130 may store the frequency of the reported cell and the ID of the original serving cell in a corresponding table (such as the one shown in FIG. 5) (step S614).

According to an embodiment of the invention, for different factors utilized for determining the weighting values, the same or different weighting values may be defined. In addition, the weighting values associated with the frequencies to be measured may be determined by one or any combination of factors. For example, when a frequency among the frequencies matches the target frequency recorded in the table as shown in FIG. 3, the weighting value associated with the frequency may be increased by W1. When a measurement configuration associated with the frequency matches the measurement configuration recorded in the table as shown in FIG. 4, the weighting value associated with the frequency may be further increased by W2. In addition, when the frequency and the serving cell ID matches a record in the table as shown in FIG. 5 and the record shows that a LAU with respect to the frequency and the serving cell was performed, the weighting value associated with the frequency may be further decreased by W3. Note that W1, W2, and W3 may be assigned the same or different values, depending on the system requirements.

Figure 7:
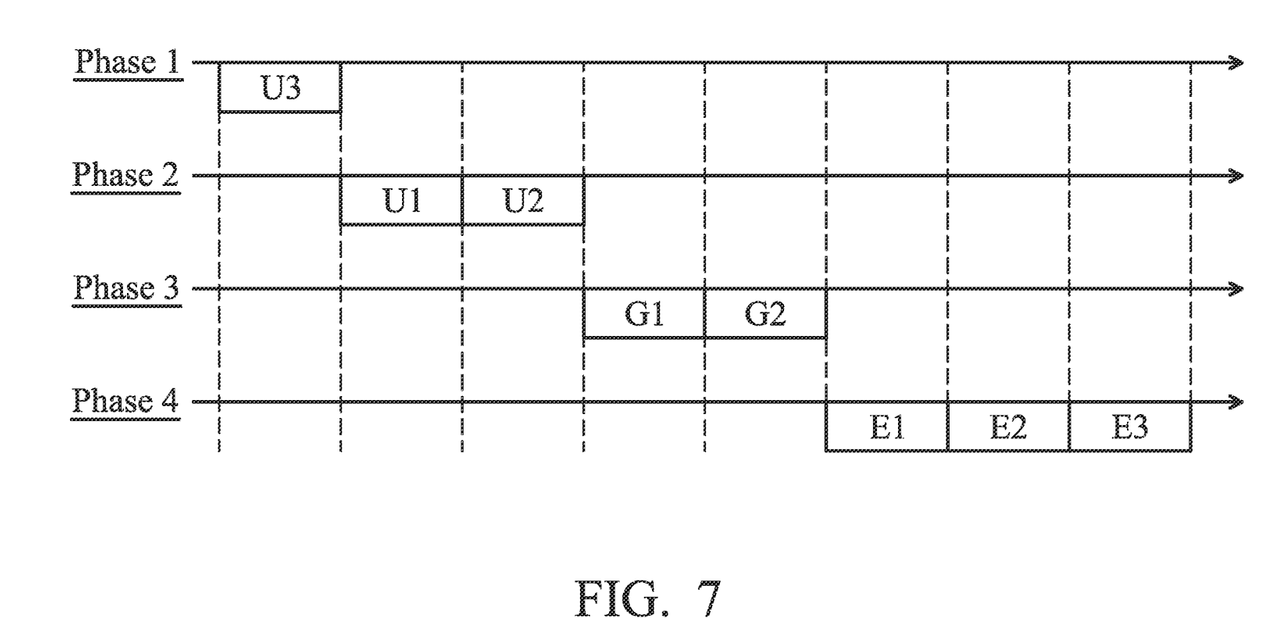
FIG. 7 shows an exemplary frequency measurement sequence determined by scheduling the frequencies to be measured in sequence according to the determined weighting values according to an embodiment of the invention.

FIG. 7 shows an exemplary frequency measurement sequence determined by scheduling the frequencies to be measured in sequence according to the determined weighting values according to an embodiment of the invention, where 'U1','U2', and 'U3' refer to UMTS frequencies, 'G1' and 'G3' refer to GSM frequencies and 'E1', 'E2', and 'E3' refer to LTE frequencies. Based on the frequency measurement sequence, the frequency with the highest weighting value, such as the UMTS frequency U3, may be measured first during phase 1. Next, the frequencies with medium weighting values, such as the UMTS frequencies U1 and U2, may be measured during phase 2. Next, the frequencies with low weighting values, such as the GSM frequencies G1 and G2, may be measured during phase 3, and after that, the normal measurements for the LTE frequencies 'E1','E2', and 'E3' may be performed. Since the UMTS frequency U3 has the highest weighting value, the wireless network may possibly command to handover (or redirection, or cell-change order) to a target cell on the frequency U3 after receiving the measurement report for the UMTS frequency U3. Once UE successfully camps on the target cell on the frequency U3, the remaining measurements for the remaining frequencies (such as the measurements that are supposed to be performed in phases 2~3 or phases 2~4) may be skipped, and the CSFB performance time may be greatly shortened as compared with that of conventional designs.

The above-described embodiments of the present invention can be implemented in any of numerous ways. For example, the embodiments may be implemented using hardware, software, or a combination thereof It should be appreciated that any component or collection of components that perform the functions described above can be generically considered as one or more processors that control the above-discussed function. The processor(s) can be implemented in numerous ways, such as with dedicated hardware, or with general-purpose hardware that is programmed using microcode or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communication apparatus, comprising:
a radio frequency (RF) signal processing device, for processing a plurality of RF signals transmitted to or received from a serving cell;
a baseband signal processing device, for processing a plurality of baseband signals; and
a processor, for controlling operations of the RF signal processing device and the baseband signal processing device,
wherein the processor determines whether performing a circuit switch fallback (CSFB) procedure is required, and when performing the CSFB procedure is required, the processor further determines a plurality of weighting values each associated with one of a plurality of frequencies to be measured during the CSFB procedure, wherein the plurality of frequencies to be measured are corresponding to candidate target cells, determines a frequency measurement sequence for scheduling the frequencies to be measured in sequence according to the determined weighting values and measures a signal quality on the frequencies according to the frequency measurement sequence.

2. The communication apparatus as claimed in claim 1, wherein the processor determines the frequency measurement sequence such that a frequency with a higher weighting value is measured earlier.

3. The communication apparatus as claimed in claim 1, wherein the processor determines the weighting values according to at least one network configuration recorded when performing one or more previous CSFB procedure(s).

4. The communication apparatus as claimed in claim 1, wherein the processor determines the weighting values according to at least one execution result obtained when performing one or more previous CSFB procedure(s).

5. The communication apparatus as claimed in claim 1, wherein the processor determines the weighting values according to a time required to complete a measurement for each frequency.

6. The communication apparatus as claimed in claim 1, wherein the processor determines the weighting values according to a data throughput supported by a radio access technology corresponding to each frequency.

7. The communication apparatus as claimed in claim 1, wherein the processor determines the weighting values according to a preferred radio access technology set by a public land mobile network associated with the serving cell.

8. The communication apparatus as claimed in claim 3, wherein the network configuration comprises a target frequency having a cell that has been successfully camped on during the previous CSFB procedure(s), and when a frequency among the frequencies matches the target frequency, the weighting value associated with the frequency is increased.

9. The communication apparatus as claimed in claim 3, wherein the network configuration comprises a radio access technology of a target frequency having a cell that has been successfully camped on during the one or more previous CSFB procedure(s), and when a radio access technology of a frequency among the frequencies matches the radio access technology of the target frequency, the weighting value associated with the frequency is increased.

10. The communication apparatus as claimed in claim 3, wherein the network configuration comprises a band of a target frequency having a cell that have been successfully camped on during the one or more previous CSFB procedure(s), and when a band of a frequency among the frequencies matches the band of the target frequency, the weighting value associated with the frequency is increased.

11. The communication apparatus as claimed in claim 3, wherein the network configuration comprises a measurement configuration set in the one or more previous CSFB procedure(s), and when a measurement configuration associated with a frequency among the frequencies matches the measurement configuration set in the one or more previous CSFB procedure(s), the weighting value associated with the frequency is increased.

12. The communication apparatus as claimed in claim 4, wherein the execution result is determined by whether a handover, a redirection, or a cell change order with respect to a target frequency was triggered upon receiving a measurement report associated with the target frequency during the one or more previous CSFB procedure(s), and when a frequency among the frequencies matches the target frequency and the handover, the redirection, or the cell change order with respect to the target frequency was triggered during the one or more previous CSFB procedure(s), the weighting value associated with the frequency is increased.

13. The communication apparatus as claimed in claim 4, wherein the execution result is determined by whether the one or more previous CSFB procedure(s) with respect to a target frequency succeeded, and when a frequency among the frequencies matches the target frequency and the one or more previous CSFB procedure(s) with respect to the target frequency succeeded, the weighting value associated with the frequency is increased.

14. The communication apparatus as claimed in claim 4, wherein the execution result is determined by whether a location area update with respect to a target frequency and the serving cell was performed during the one or more previous CSFB procedure(s), and when a frequency among the frequencies matches the target frequency and the location area update with respect to the target frequency and the serving cell was performed, the weighting value associated with the frequency is decreased.

15. A method for shortening circuit switch fallback (CSFB) performance time, executed by a communication apparatus camping on a serving cell, comprising:
determining a plurality of weighting values, each associated with one of a plurality of frequencies to be measured during a CSFB procedure, wherein the plurality of frequencies to be measured are corresponding to candidate target cells;
determining a frequency measurement sequence for scheduling the frequencies to be measured in sequence according to the determined weighting values; and
measuring a signal quality on the frequencies according to the frequency measurement sequence.

16. The method as claimed in claim 15, wherein a frequency with a higher weighting value is measured earlier.

17. The method as claimed in claim 15, wherein the weighting values are determined according to at least one network configuration recorded when performing one or more previous CSFB procedure(s).

18. The method as claimed in claim 15, wherein the weighting values are determined according to at least one execution result obtained when performing one or more previous CSFB procedure(s).

19. The method as claimed in claim 15, wherein the weighting values are determined according to a time required to complete a measurement for each frequency.

20. The method as claimed in claim 15, wherein the weighting values are determined according to a data throughput supported by a radio access technology corresponding to the each frequency.

21. The method as claimed in claim 15, wherein the weighting values are determined according to a preferred radio access technology set by a public land mobile network associated with the serving cell.

22. The method as claimed in claim 17, wherein the network configuration comprises a target frequency having a cell that have been successfully camped on during the one or more previous CSFB procedure(s), and when a frequency among the frequencies matches the target frequency, the weighting value associated with the frequency is increased.

23. The method as claimed in claim 17, wherein the network configuration comprises a radio access technology of a target frequency having a cell that has been successfully camped on during the one or more previous CSFB procedure(s), and when a radio access technology of a frequency among the frequencies matches the radio access technology of the target frequency, the weighting value associated with the frequency is increased.

24. The method as claimed in claim 17, wherein the network configuration comprises a band of a target frequency having a cell that has been successfully camped on during the one or more previous CSFB procedure(s), and when a band of a frequency among the frequencies matches the band of the target frequency, the weighting value associated with the frequency is increased.

25. The method as claimed in claim 17, wherein the network configuration comprises a measurement configuration set in the one or more previous CSFB procedure(s), and when a measurement configuration associated with a frequency among the frequencies matches the measurement configuration set in the one or more previous CSFB procedure(s), the weighting value associated with the frequency is increased.

26. The method as claimed in claim 18, wherein the execution result is determined by whether a handover, a redirection, or a cell change order with respect to a target frequency was triggered upon receiving a measurement report associated with the target frequency during the one or more previous CSFB procedure(s), and when a frequency among the frequencies matches the target frequency and the handover, the redirection or the cell change order with respect to the target frequency was triggered during the one or more previous CSFB procedure(s), the weighting value associated with the frequency is increased.

27. The method as claimed in claim 18, wherein the execution result is determined by whether the one or more previous CSFB procedure(s) with respect to a target frequency succeeded, and when a frequency among the frequencies matches the target frequency and the one or more previous CSFB procedure(s) with respect to the target frequency succeeded, the weighting value associated with the frequency is increased.

28. The method as claimed in claim 18, wherein the execution result is determined by whether a location area update with respect to a target frequency and the serving cell was performed during the one or more previous CSFB procedure(s), and when a frequency among the frequencies matches the target frequency and the location area update with respect to the target frequency and the serving cell was performed, the weighting value associated with the frequency is decreased.

\* \* \* \* \*